US010705216B2

(12) United States Patent
Wang et al.

(10) Patent No.: US 10,705,216 B2
(45) Date of Patent: Jul. 7, 2020

(54) THREE-DIMENSIONAL POINT CLOUD TRACKING APPARATUS AND METHOD USING RECURRENT NEURAL NETWORK

(71) Applicant: INSTITUTE FOR INFORMATION INDUSTRY, Taipei (TW)

(72) Inventors: Chih-Wei Wang, Hsinchu (TW); Ywe-Ting Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 272 days.

(21) Appl. No.: 15/834,781

(22) Filed: Dec. 7, 2017

(65) Prior Publication Data

US 2019/0179021 A1 Jun. 13, 2019

(51) Int. Cl.
| | | |
|---|---|---|
| *G01S 17/66* | (2006.01) | |
| *G06K 9/00* | (2006.01) | |
| *G06N 3/08* | (2006.01) | |
| *G01S 17/89* | (2020.01) | |
| *G06K 9/62* | (2006.01) | |

(52) U.S. Cl.
CPC .............. *G01S 17/66* (2013.01); *G01S 17/89* (2013.01); *G06K 9/00201* (2013.01); *G06K 9/00791* (2013.01); *G06K 9/6256* (2013.01); *G06N 3/08* (2013.01)

(58) Field of Classification Search
CPC ....................................................... G01S 17/66
See application file for complete search history.

(56) References Cited

U.S. PATENT DOCUMENTS

| | | | |
|---|---|---|---|
| 9,235,988 | B2 | 1/2016 | Mimeault et al. |
| 10,366,502 | B1* | 7/2019 | Li |
| 2017/0213093 | A1* | 7/2017 | Li .............................. G06T 7/12 |
| 2017/0347100 | A1* | 11/2017 | Chou ...................... G06T 9/001 |
| 2018/0293711 | A1* | 10/2018 | Vogels ...................... G06K 9/40 |
| 2018/0341836 | A1* | 11/2018 | Lim ....................... G06T 3/4053 |
| 2019/0096086 | A1* | 3/2019 | Xu ............................ G06T 7/11 |
| 2019/0156211 | A1* | 5/2019 | Dong ..................... G06N 3/084 |

FOREIGN PATENT DOCUMENTS

| | | |
|---|---|---|
| CN | 107226087 A | 10/2017 |
| CN | 107423679 A | 12/2017 |

* cited by examiner

*Primary Examiner* — Raymond L Nimox (57) ABSTRACT

The embodiments of the present invention provide a three-dimensional point cloud tracking apparatus and method using a recurrent neural network. The three-dimensional point cloud tracking apparatus and method can track the three-dimensional point cloud of the entire environment and model the entire environment by using a recurrent neural network model. Therefore, the three-dimensional point cloud tracking apparatus and method can be used to reconstruct the three-dimensional point cloud of the entire environment at the current moment and also can be used to predict the three-dimensional point cloud of the entire environment at a later moment.

12 Claims, 6 Drawing Sheets

THREE-DIMENSIONAL POINT CLOUD TRACKING APPARATUS AND METHOD USING RECURRENT NEURAL NETWORK

FIELD OF THE INVENTION

The present invention relates to a point cloud tracking apparatus and method, and more particularly to a three-dimensional (3D) point cloud tracking apparatus and method utilizing a recurrent neural network (RNN).

BACKGROUND OF THE INVENTION

"Point cloud" refers to the form of data obtained through three-dimensional laser scanners. Nowadays, three-dimensional laser scanners are also referred to as "LiDARs," which rapidly acquire a large number of points on the surface of a scanned object mainly using a sensed reflected laser beam. Because each of these points contains a three-dimensional coordinate so that the LiDAR can establish a three-dimensional point cloud about the scanned object to describe the surface shape of the scanned object.

Therefore, in recent years, LiDAR has been commonly used in self-driving systems or road-sensing systems for the purpose of obstacle avoidance or tracking vehicles. However, when the scanned object is shaded or dead end of vision of LiDAR, the prior art cannot establish a three-dimensional point cloud about the scanned object and thus loses the above functions. Therefore, there is a need in the art for a way that can be used to reconstruct and predict three-dimensional point clouds.

SUMMARY OF THE INVENTION

An objective of the present invention is to provide a three-dimensional point cloud tracking apparatus and method using a recurrent neural network. In order to respond to a complex environment with multiple moving targets, the present invention targets the three-dimensional point cloud of the entire environment as a tracking object. That is, the present invention is used to reconstruct and predict the three-dimensional point cloud of the entire environment.

To achieve the above objectives, an embodiment of the present invention provides a three-dimensional point cloud tracking apparatus using a recurrent neural network. The three-dimensional point cloud tracking apparatus includes an input/output interface, a memory and a processor. The input/output interface is configured to receive different observed three-dimensional point clouds at different moments in an environment, wherein the observed three-dimensional point clouds are obtained by a scanning of at least one LiDAR. The memory is configured to store at least one memory three-dimensional point cloud related to the environment. The processor is electrically connected to the input/output interface and the memory respectively and configured to receive the observed three-dimensional point clouds and the at least one memory three-dimensional point cloud. When receiving the observed three-dimensional point cloud of the environment at a first moment, the processor utilizes at least one recurrent neural network model to perform an environment reconstruction operation on the observed three-dimensional point cloud and the at least one memory three-dimensional point cloud to obtain a reconstructed three-dimensional point cloud of the environment at the first moment, and then utilizes the recurrent neural network model again to perform an environment prediction operation on the at least one memory three-dimensional point cloud and a blank three-dimensional point cloud to obtain a predicted three-dimensional point cloud of the environment at a second moment. The second moment is later than the first moment In addition, an embodiment of the present invention further provides a three-dimensional point cloud tracking method using a recurrent neural network and executed in the aforementioned three-dimensional point cloud tracking apparatus. The three-dimensional point cloud tracking method includes: configuring the input/output interface to receive different observed three-dimensional point clouds at different moments in an environment, wherein the observed three-dimensional point clouds are obtained by a scanning of at least one LiDAR; configuring the memory to store at least one memory three-dimensional point cloud related to the environment; and configuring the processor to receive the observed three-dimensional point clouds and the at least one memory three-dimensional point cloud, configuring, when receiving the observed three-dimensional point cloud of the environment at a first moment, the processor to utilize at least one recurrent neural network model to perform an environment reconstruction operation on the observed three-dimensional point cloud and the at least one memory three-dimensional point cloud to obtain a reconstructed three-dimensional point cloud of the environment at the first moment, and configuring the processor to utilize the recurrent neural network model again to perform an environment prediction operation on the at least one memory three-dimensional point cloud and a blank three-dimensional point cloud to obtain a predicted three-dimensional point cloud of the environment at a second moment, wherein the second moment is later than the first moment.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
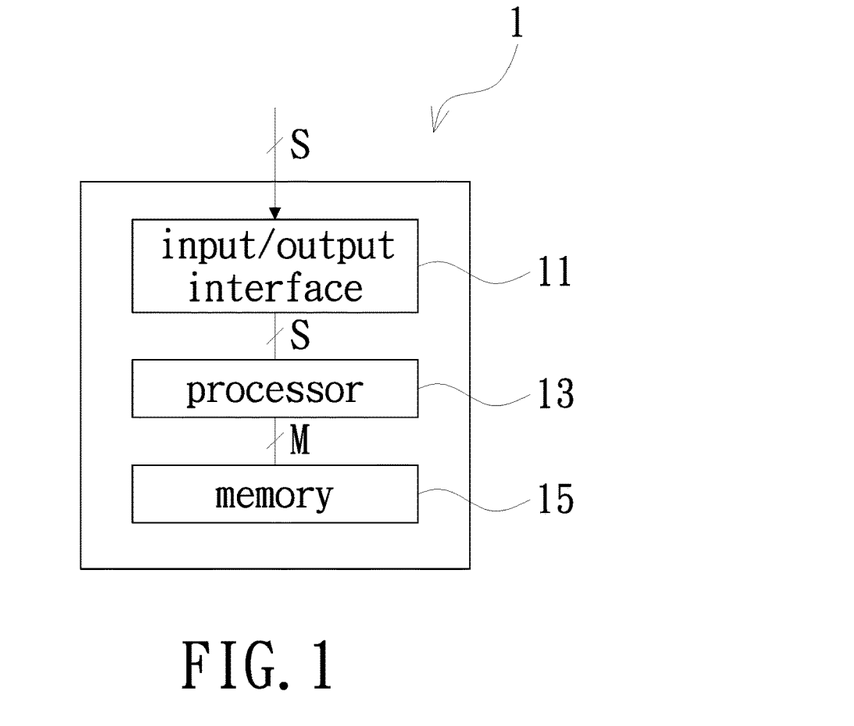
FIG. 1 is a functional block diagram of a three-dimensional point cloud tracking apparatus using a recurrent neural network according to an embodiment of the present invention

Referring to FIG. 1, which is a functional block diagram of a three-dimensional point cloud tracking apparatus using a recurrent neural network according to an embodiment of the present invention. The three-dimensional point cloud tracking apparatus 1 includes an input/output interface 11, a processor 13 and a memory 15. It is to be noted that each of the above elements may be implemented by a pure hardware circuit or by a combination of a hardware circuit and firmware or software, but the invention is not limited thereto. In addition, the above elements may be integrated or separately provided, and the present invention is not limited thereto. In conclusion, the present invention does not limit the specific implementation of the three-dimensional point cloud tracking apparatus 1.

In the present embodiment, the input/output interface 11 is configured to receive different observed three-dimensional point clouds S at different moments in an environment (not shown), and the observed three-dimensional point clouds S are obtained by a scanning of at least one LiDAR (not shown). Since the principle of scanning of LiDAR is well-known to those skilled in the art, the details of the observed three-dimensional point cloud S are not repeated herein. In addition, the memory 15 is configured to store at least one memory three-dimensional point cloud M related to the environment. The specific content of the memory three-dimensional point cloud M will be described in detail below by other embodiments, and therefore no redundant detail is to be given herein. The processor 13 is electrically connected to the input/output interface 11 and the memory 15 respectively and is configured to receive the observed three-dimensional point cloud S and the memory three-dimensional point cloud M.

Figure 2:
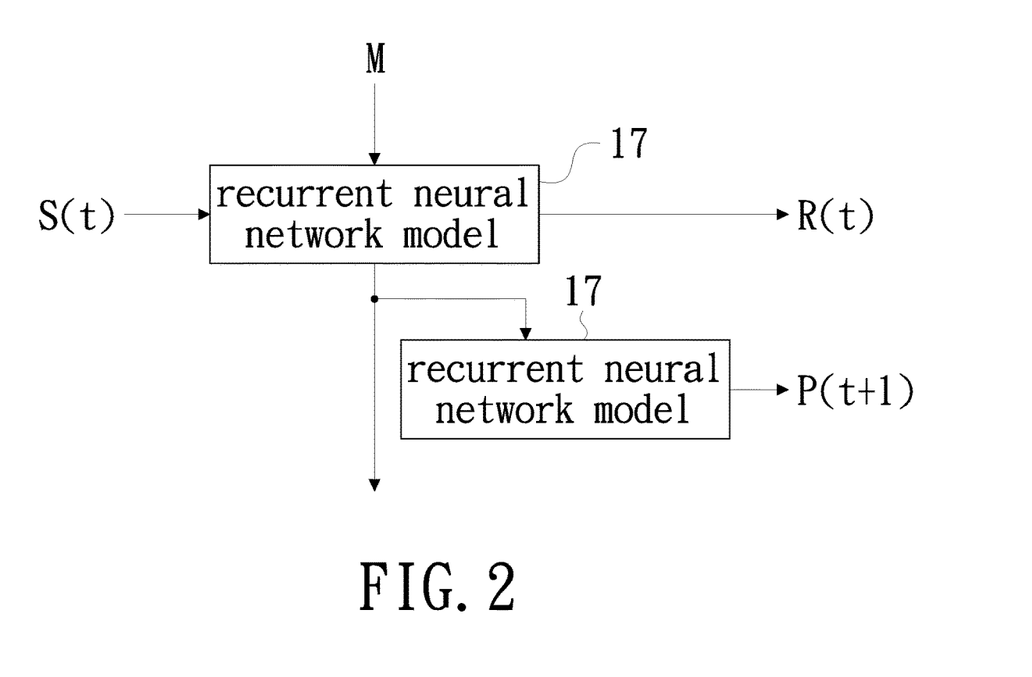
FIG. 2 is a schematic operation view of a processor in the three-dimensional point cloud tracking apparatus in FIG. 1.

Please also refer to FIG. 2, which is used to explain the specific operation of the processor 13 in FIG. 1. As shown in FIG. 2, when receiving the observed three-dimensional point cloud S(t) of the environment at a first moment (for example, time t), the processor 13 utilizes at least one recurrent neural network model 17 to perform an environment reconstruction operation on the observed three-dimensional point cloud S(t) and the memory three-dimensional point cloud M to obtain a reconstructed three-dimensional point cloud R(t) of the environment at the first moment (t), and then utilizes the recurrent neural network model 17 to perform an environment prediction operation on the memory three-dimensional point cloud M and a blank three-dimensional point cloud (not shown) to obtain a predicted three-dimensional point cloud P(t+1) of the environment at the second moment (for example, time t+1). It should be understood that the second moment is later than the first moment.

However, in order to facilitate the following description, the first and second moments of the present embodiment are described by using the time t and time t+1, but it is not intended to limit the present invention. Similarly, in order to facilitate the following description, the number of the recurrent neural network model 17 in FIG. 2 is described by one only, but it is not intended to limit the present invention. That is, the recurrent neural network model 17 in FIG. 2 that performs the environment reconstruction operation or the environment prediction operation respectively may refer to the same recurrent neural network model 17 or different recurrent neural network models 17, and the present invention is not limited thereto.

In addition, the specific operation manner of performing the environment reconstruction operation or performing the environment prediction operation in the recurrent neural network model 17 of FIG. 2 will be described in detail below by other embodiments, and therefore no redundant detail is to be given herein. It should be noted that, although FIG. 2 only uses the recurrent neural network model 17 once again to obtain the predicted three-dimensional point cloud P (t+1) of the environment at the time t+1, the present invention is not limited thereto. In other words, as long as the processing time and the computing capability are sufficient, the embodiment of the present invention itself can determine the number of recursions of the recurrent neural network model 17 in accordance with the period of the next time of prediction (that is, the time interval between the second moment and the first moment) to obtain the predicted three-dimensional point cloud of the environment at other second moment (for example, time t+2).

In summary, according to the teachings above, it should be understood by those skilled in the art that since the present invention particularly targets the three-dimensional point cloud of the entire environment as a tracking object, therefore, when the environment at the current moment (e.g., the first time t) has a partial area three-dimensional point cloud that cannot be obtained in this environment due to a moving object being shaded, the present invention is able to estimate the three-dimensional point cloud information of the moving object by using the memory three-dimensional point cloud of the environment stored in the past, so as to supplement the currently unknown three-dimensional point cloud of the partial area. In other words, the present invention can correctly reconstruct the three-dimensional point cloud of the environment at the current moment.

On the other hand, for the above shielded moving object, because the prior art generally can predict the future change of the moving object only by a constant speed moving manner, the prior art may easily lose track of the moving object when the moving object is moving at a non-constant velocity or when the moving object is shielded for a long time. However, since the present invention utilizes a recurrent neural network model to encode the three-dimensional point cloud of the entire environment, the present invention is still able to predict the three-dimensional point cloud of this environment at a later moment even if the movement of a moving object in this environment is complicated or when the moving object is shaded for a long time. In other words, the present invention can accurately track the future changes of moving objects in this environment.

Figure 3A:
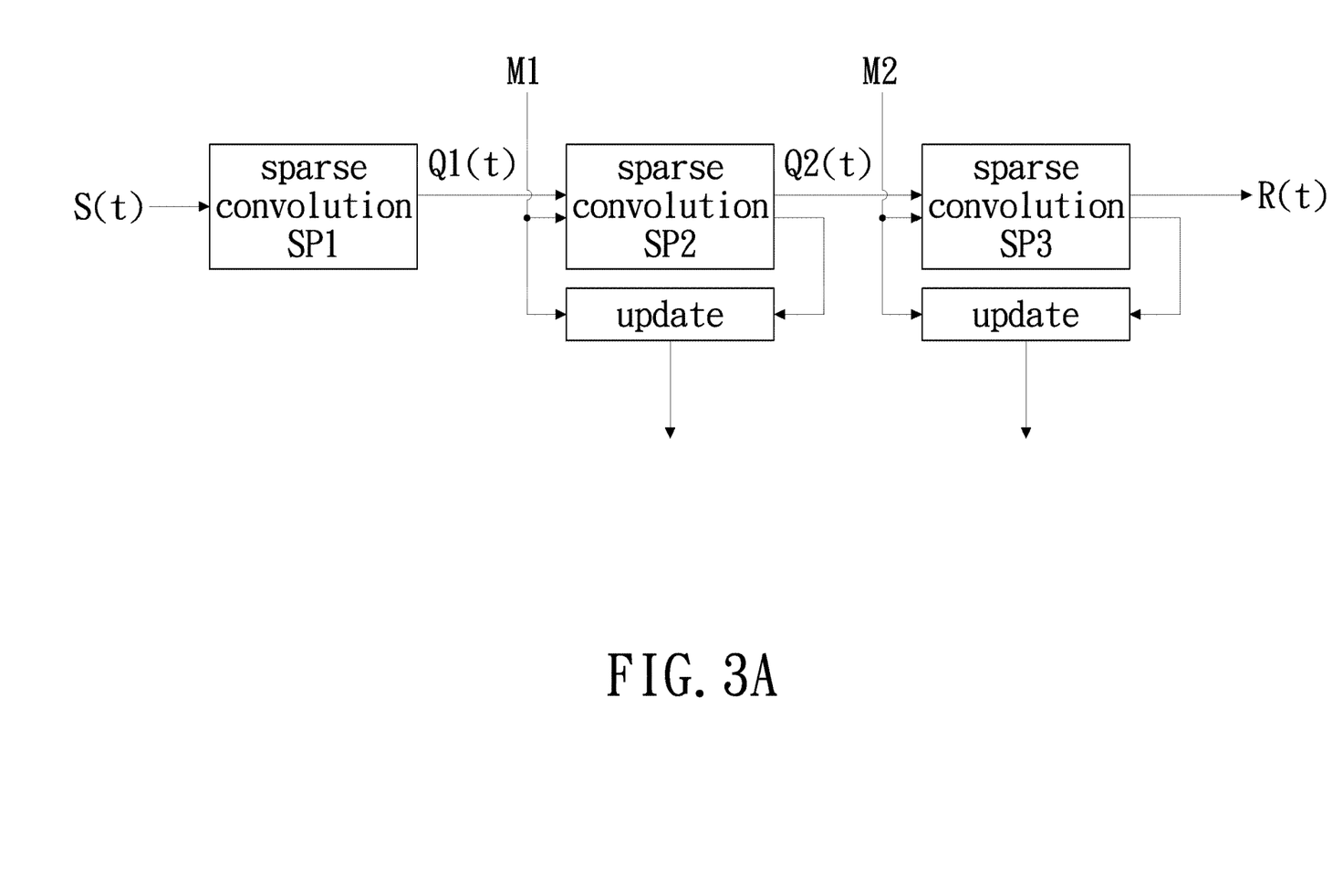
FIG. 3A is a schematic operation view of an environment reconstruction operation in the recurrent neural network model in FIG. 2.

Next, please also refer to FIG. 3A, which is a schematic view for explaining a specific operation of the environment reconstruction operation in the recurrent neural network model 17 in FIG. 2. It should be noted that, in order to facilitate the following description, the number of memory three-dimensional point clouds M in FIG. 3A is described by two as an example. That is, the memory three-dimensional point cloud M may include a first memory three-dimensional point cloud M1 and a second memory three-dimensional point cloud M2, but the present invention is not limited thereto.

As shown in FIG. 3A, the recurrent neural network model 17 first performs a first sparse convolution operation on an observed three-dimensional point cloud S(t) to obtain a calculated three-dimensional point cloud Q1(*t*) after a first sparse convolution SP1. Then, the recurrent neural network model 17 performs a second sparse convolution operation on the calculated three-dimensional point cloud Q1 (*t*) and a first memory three-dimensional point cloud M1 to obtain a calculated three-dimensional point cloud Q2(*t*) after a second sparse convolution SP2, and updates the first memory three-dimensional point cloud M1 with the calculated three-dimensional point cloud Q2(*t*). Finally, the recurrent neural network model 17 performs a third sparse convolution operation on the calculated three-dimensional point cloud Q2(*t*) and a second memory three-dimensional point cloud M2 to obtain a reconstructed three-dimensional point cloud R(t) of environment at the time t (i.e., the first moment), and updates the second memory three-dimensional point cloud M2 with the reconstructed three-dimensional point cloud R(t).

It can be seen from the above that, because FIG. 3A uses the operation characteristic of sparse convolution, the three-dimensional point cloud tracking apparatus 1 in the present embodiment is capable of processing complicated three-dimensional point cloud information with reasonable time and computing capability. Since the operation principle of sparse convolution is well known to those skilled in the art, details about the sparse convolutions SP1 to SP3 will not be repeated here. It should be noted that, the three-layer sparse convolution manner (that is, the sparse convolutions SP1 to SP3) used in FIG. 3A is merely an example, and the present invention is not limited thereto. In other words, those skilled in the art should be able to make a design of sparse convolution of different levels according to actual needs or applications.

In addition, in an application, the recurrent neural network model 17 may be configured to use only a part of the sparse convolution operation result for the next-layer sparse convolution operation or output and use another part of the sparse convolution operation result for updating the memory three-dimensional point cloud. For example, in FIG. 3A, after the sparse convolution SP2, the recurrent neural network model 17 may use only part of the calculated three-dimensional point cloud Q2(*t*) for the next-layer sparse convolution operation (i.e., sparse convolution SP3) and use another part of the calculated three-dimensional point cloud Q2(*t*) for updating the first memory three-dimensional point cloud M1.

However, since the number of convolution kernels of the calculated three-dimensional point cloud Q2(*t*) after the second sparse convolution SP2 can be divided into several features (or channels), the above two parts of calculated three-dimensional point cloud Q2(*t*) can refer to data that contains different channels. That is, the data of the two parts of calculated three-dimensional point cloud Q2(*t*) may be completely non-overlapping. In conclusion, the present invention does not limit the specific implementation of sparse convolution operation or update of memory three-dimensional point cloud.

On the other hand, if it is considered that the first or second memory three-dimensional point cloud M1, M2 cannot be completely replaced by only the calculated three-dimensional point cloud Q2(*t*) or the reconstructed three-dimensional point cloud R(t), the processor 13 in an application may further be configured to define at least one weight self-defined function f, at least one first sparse convolution kernel K1 and at least one second sparse convolution kernel K2. It is to be noted that the above weight self-defined function f, the first sparse convolution kernel K1 and the second sparse convolution kernel K2 may be defined after the three-dimensional point cloud tracking apparatus 1 completes a training mode, but the present invention is not limited thereto.

For example, the training mode may use a recurrent neural network model 17 to perform an environment reconstruction operation on a known three-dimensional point cloud (not shown) to obtain a reconstructed three-dimensional point cloud thereof and then develop the feature parameters of the recurrent neural network model 17 (e.g., the weight self-defined function f, the first sparse convolution kernel K1, the second sparse convolution kernel K2, or the like, or each convolution kernel parameter in the sparse convolutions SP1 to SP3) by comparing the error between the known three-dimensional point cloud and the reconstructed three-dimensional point cloud thereof.

In addition, in the training mode, the recurrent neural network model 17 may also increase the sparse degree of sparse convolution by using a linear hinge loss and adding L1 penalty. Since the principles of the training mode are well known to those skilled in the art, the aforementioned content will be merely illustrative and no redundant detail is to be given herein. In conclusion, the present invention does not limit the specific implementation of the three-dimensional point cloud tracking apparatus 1 in the training mode, and therefore, those skilled in the art should be able to make related designs according to actual needs or applications.

Further, in a preferred embodiment of updating the first memory three-dimensional point cloud M1 by the calculated three-dimensional point cloud Q2(*t*), the recurrent neural network model 17 uses the weight self-defined function f to determine a weight vector p from the first memory three-dimensional point cloud M1, the calculated three-dimensional point cloud Q2(*t*), the first sparse convolution kernel K1 and the second sparse convolution kernel K2, and updates the first memory three-dimensional point cloud M1 to a result of substituting the first memory three-dimensional point cloud M1, the calculated three-dimensional point cloud Q2(*t*) and the weight vector p to a weight formula.

Similarly, in a preferred embodiment of updating the second memory three-dimensional point cloud M2 by the reconstructed three-dimensional point cloud R(t), the recurrent neural network model 17 uses the weight self-defined function f to determine a weight vector p from the second memory three-dimensional point cloud M2, reconstructed three-dimensional point cloud R(t), the first sparse convolution kernel K1 and the second sparse convolution kernel K2, and updates the second memory three-dimensional point cloud M2 to a result of substituting the second memory three-dimensional point cloud M2, the reconstructed three-dimensional point cloud R(t) and the weight vector p to the aforementioned weight formula.

Figure 3B:
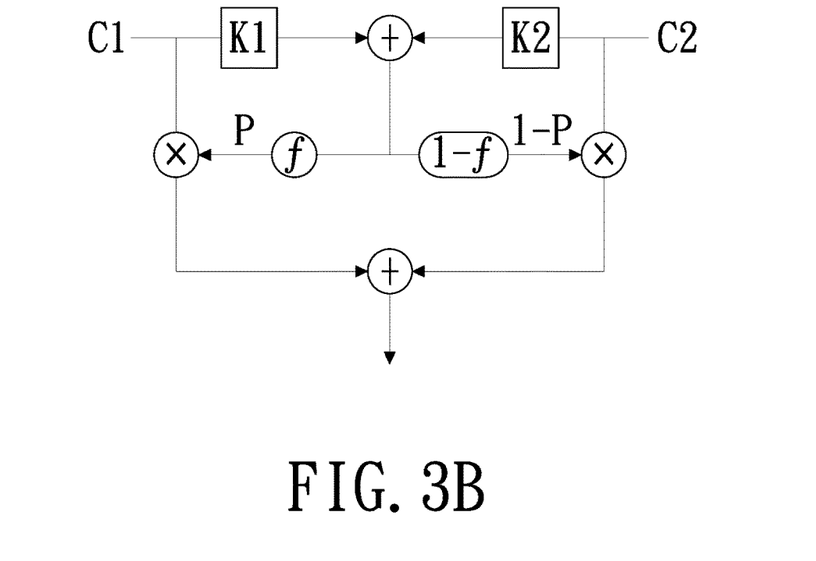
FIG. 3B is a schematic operation view of a preferred embodiment of updating the first or second memory three-dimensional point cloud in the environment reconstruction operation of FIG. 3A.

Therefore, it should be understood that, in the two preferred embodiments of updating the first and second memory three-dimensional point clouds M1, M2, the weight self-defined function f and the first and second sparse convolution kernels K1, K2 used in each preferred embodiment may be different from each. In conclusion, the present invention does not limit the specific implementation of the weight self-defined function f and the first and second sparse convolution kernels K1, K2. Then, please also refer to FIG. 3B, which is used to explain a specific operation manner of a preferred embodiment of updating the first or second memory three-dimensional point cloud in the environment reconstruction operation in FIG. 3A. In FIG. 3B, the weight formula is $p \times C1 + (1-p) \times C2$, and the weight vector p is expressed as $p = f(C1 \times K1 + C2 \times K2)$, wherein C1 and C2 are the first memory three-dimensional point cloud M1 and the calculated three-dimensional point cloud Q2(t) or the second memory three-dimensional point cloud M2 and the reconstructed three-dimensional point cloud R(t).

According to the teachings above, it should be understood that the component of the weight vector p is located between 0 and 1. That is, assuming that the weight vector p is all 0, the recurrent neural network model 17 will only use the calculated three-dimensional point cloud Q2(t) or the reconstructed three-dimensional point cloud R(t) (that is, C2) to replace the current first or second memory three-dimensional point cloud M1, M2. Similarly, assuming that the weight vector p are all 1, the recurrent neural network model 17 will only use the original first or second memory three-dimensional point cloud M1, M2 to maintain the current first or second memory three-dimensional point cloud M1, M2 (that is, C1), instead of using the calculated three-dimensional point cloud Q2(t) or the reconstructed three-dimensional point cloud R(t) to update the current first or second memory three-dimensional point cloud M1, M2. In conclusion, the specific implementation of updating the first or second memory three-dimensional point cloud M1, M2 used in FIG. 3B is only an example herein, and the present invention is not limited thereto.

Furthermore, it can be seen from the above that the memory three-dimensional point cloud M (that is, the first and second memory three-dimensional point clouds M1, M2) stored in the memory 15 in FIG. 1 is not only the observed three-dimensional point clouds S received by the input/output interface 11 at different moments but also the data result of the observed three-dimensional point clouds S after several times of sparse convolution and update processing (e.g., FIG. 3A). That is, the memory three-dimensional point cloud M in FIG. 2 is the data result obtained after several spare convolutions and updates of the observed three-dimensional point cloud S(t−1) (not shown) received in the past. Therefore, in one application, the memory three-dimensional point cloud M may be generated only after the three-dimensional point cloud tracking apparatus 1 starts to detect the environment, rather than being stored in the memory 15 from the beginning. In addition, assuming that the observed three-dimensional point cloud S(t) is the initial observation data, the memory three-dimensional point cloud M stored in the memory 15 may be generated by the blank three-dimensional point cloud after several times of sparse convolution and update processing. In conclusion, the present invention does not limit the specific implementation of memory three-dimensional point cloud M.

Figure 3C:
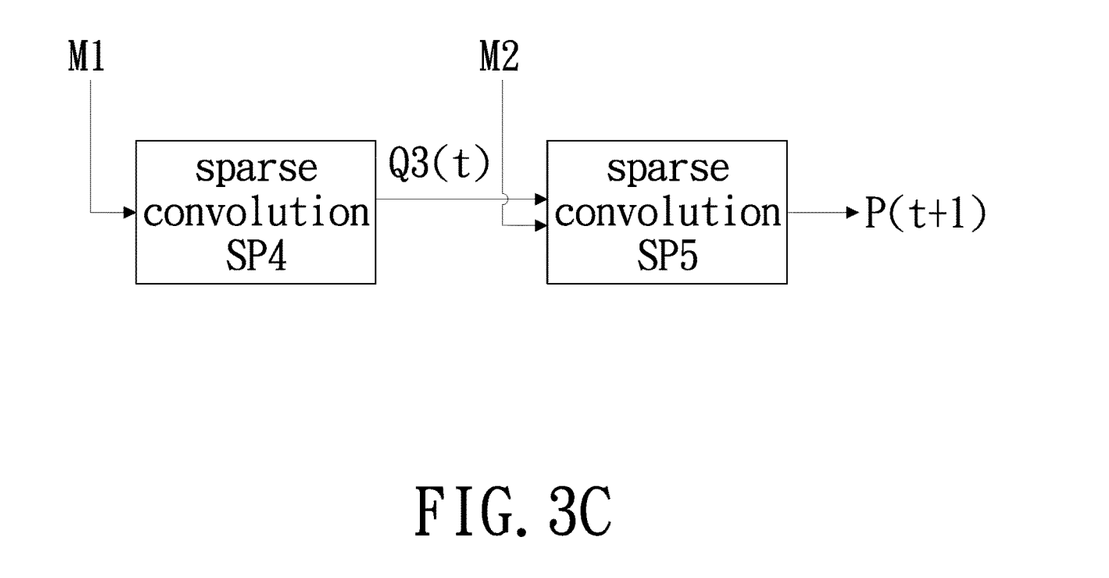
FIG. 3C is a schematic operation view of performing an environment prediction operation in the recurrent neural network model in FIG. 2.

Further, please also refer to FIG. 3C, which is a schematic view for explaining a specific operation of the environment prediction operation in the recurrent neural network model 17 in FIG. 2. As shown in FIG. 3C, the recurrent neural network model 17 first performs a fourth sparse convolution operation on a blank three-dimensional point cloud (not shown) and the first memory three-dimensional point cloud M1 to obtain a calculated three-dimensional point cloud Q3(t) after a fourth sparse convolution SP4. Then, the recurrent neural network model 17 performs a fifth sparse convolution operation on the calculated three-dimensional point cloud Q3(t) and the second memory point cloud M2 to obtain a predicted three-dimensional point cloud P(t+1) of the environment at time t+1 (i.e., the second moment). Since some of the technical principles in FIG. 3C are the same as those in FIG. 3A, no redundant detail is to be given herein. In conclusion, the specific implementation of the environment prediction operation used in FIG. 3C is also an example only herein, and the present invention is not limited thereto.

Figure 4:
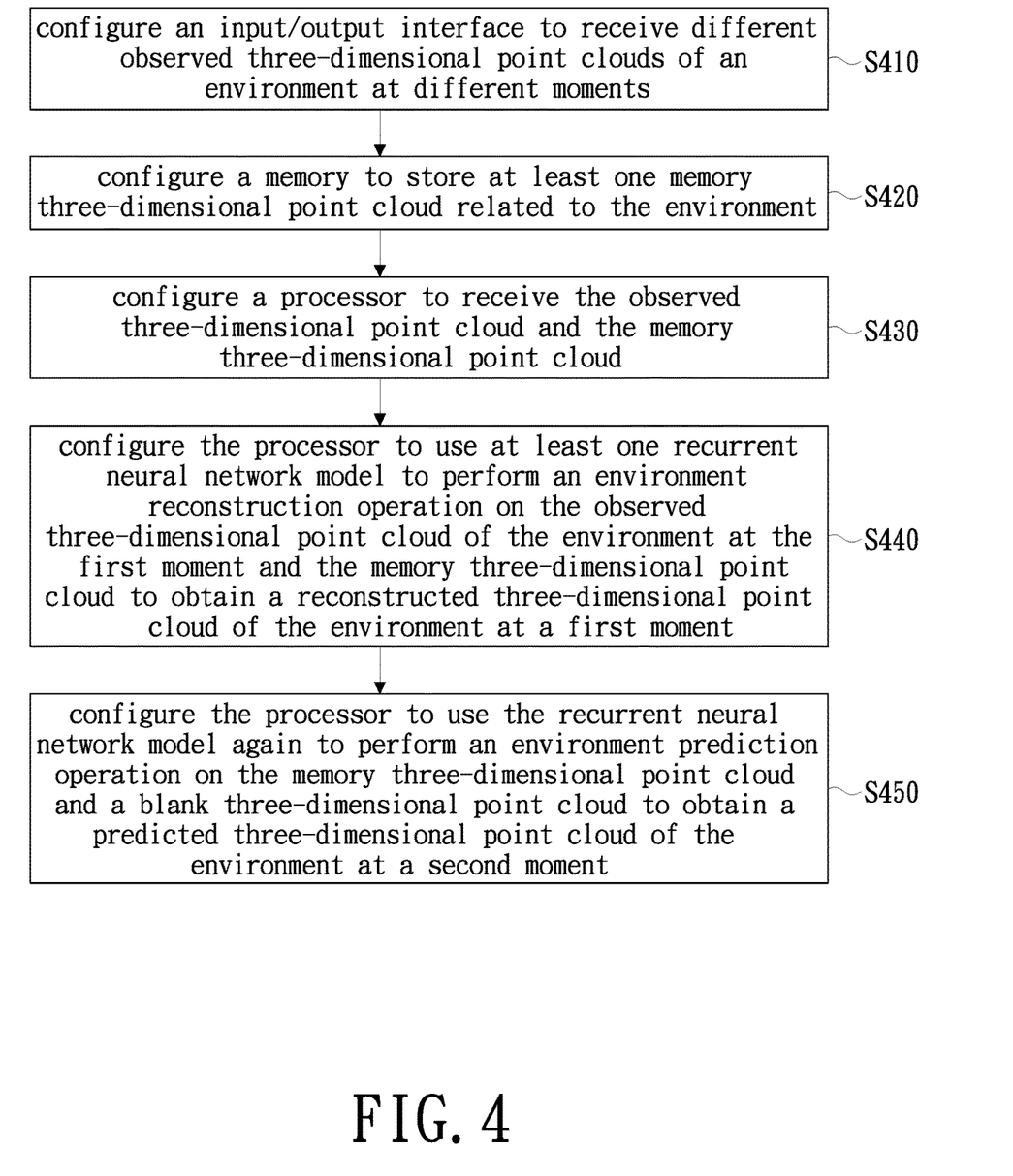
FIG. 4 is a flowchart of a three-dimensional point cloud tracking method using a recurrent neural network according to an embodiment of the present invention.

Finally, in order to further explain the operation procedure of the three-dimensional point cloud tracking apparatus 1, the present invention further provides an implementation of a three-dimensional point cloud tracking method. Referring to FIG. 4, which is a flowchart of a three-dimensional point cloud tracking method using a recurrent neural network according to an embodiment of the present invention. The three-dimensional point cloud tracking method of FIG. 4 may be executable to the three-dimensional point cloud tracking apparatus 1 of FIG. 1; however, the present invention does not limit the three-dimensional point cloud tracking method of FIG. 4 is executed only by the three-dimensional point cloud tracking apparatus of FIG. 1. In addition, the detailed steps of the three-dimensional point cloud tracking method have been described in the foregoing embodiment, and FIG. 4 is only for overview and no redundant detail is to be given herein.

As shown in FIG. 4, first, in step S410, an input/output interface is configured to receive different observed three-dimensional point clouds of an environment at different moments, wherein the observed three-dimensional point clouds are obtained by the scanning of at least one LiDAR. Thereafter, in step S420, a memory is configured to store at least one memory three-dimensional point cloud related to the environment. Thereafter, in step S430, the processor is configured to receive the observed three-dimensional point cloud and the memory three-dimensional point cloud. Steps S440 to S450 are performed when the observed three-dimensional point cloud of the environment at the first moment is received.

In step S440, the processor is configured to use at least one recurrent neural network model to perform an environment reconstruction operation on the observed three-dimensional point cloud and the memory three-dimensional point cloud to obtain a reconstructed three-dimensional point cloud of the environment at the first moment. In step S450, the processor is configured to use the recurrent neural network model again to perform an environment prediction operation on the memory three-dimensional point cloud and a blank three-dimensional point cloud to obtain a predicted three-dimensional point cloud of the environment at the second moment. Wherein the second moment is later than the first moment.

Figure 5A:
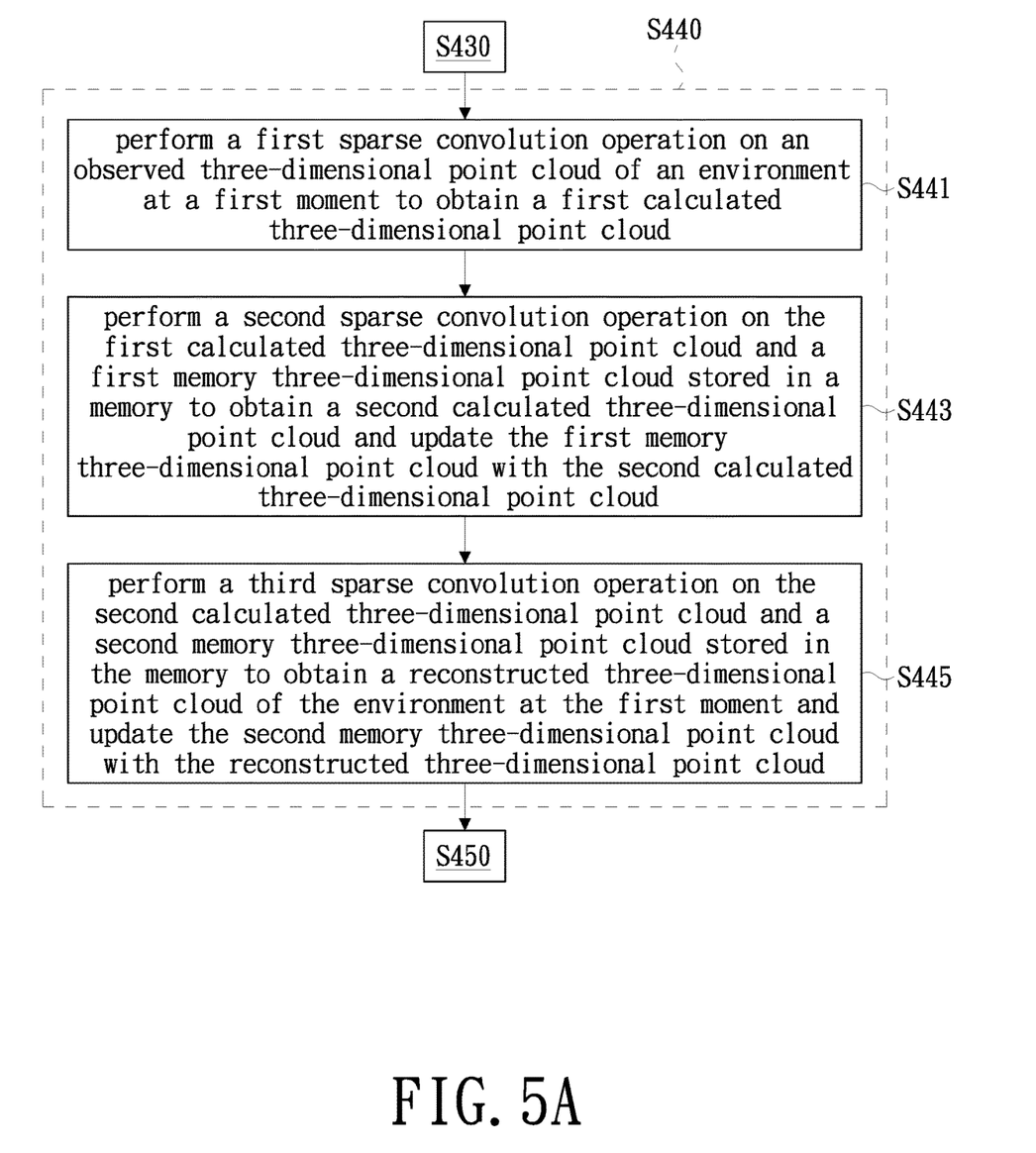
FIG. 5A is a flowchart of the environment reconstruction operation using a recurrent neural network model in the three-dimensional point cloud tracking method of FIG. 4.

According to the teaching above, it should be understood by those skilled in the art that Steps S410, S420 and S430 should be performed in parallel without conflicting. In addition, in order to further explain the implementation details about step S440, the present invention further provides an implementation of step S440. Referring to FIG. 5A, which is a flowchart of the environment reconstruction operation using a recurrent neural network model in the three-dimensional point cloud tracking method of FIG. 4. In FIG. 5A, the same process steps as those in FIG. 4 are denoted by the same reference numbers, and no redundant detail is to be given herein.

In the embodiment of FIG. 5A, step S440 may further include steps S441 to S445. First, in step S441, the recurrent neural network model first performs a first sparse convolution operation on an observed three-dimensional point cloud to obtain a first calculated three-dimensional point cloud after a first sparse convolution. Thereafter, in step S443, the recurrent neural network model performs a second sparse convolution operation on the first calculated three-dimensional point cloud and a first memory three-dimensional point cloud stored in a memory to obtain a second calculated three-dimensional point cloud after a second sparse convolution, and updates the first memory three-dimensional point cloud with the second calculated three-dimensional point cloud.

Thereafter, in step S445, the recurrent neural network model performs a third sparse convolution operation on the second calculated three-dimensional point cloud and a second memory three-dimensional point cloud stored in the memory to obtain a reconstructed three-dimensional point cloud of environment at the first moment, and updates the second memory three-dimensional point cloud with the reconstructed three-dimensional point cloud. It should be noticed that the implementation adopted in FIG. 5A is only used for exemplification, and the present invention is not limited thereto. In addition, a preferred embodiment of updating the first or second memory three-dimensional point cloud in FIG. 5A may be referred to as shown in FIG. 3B, and no redundant detail is to be given herein.

Figure 5B:
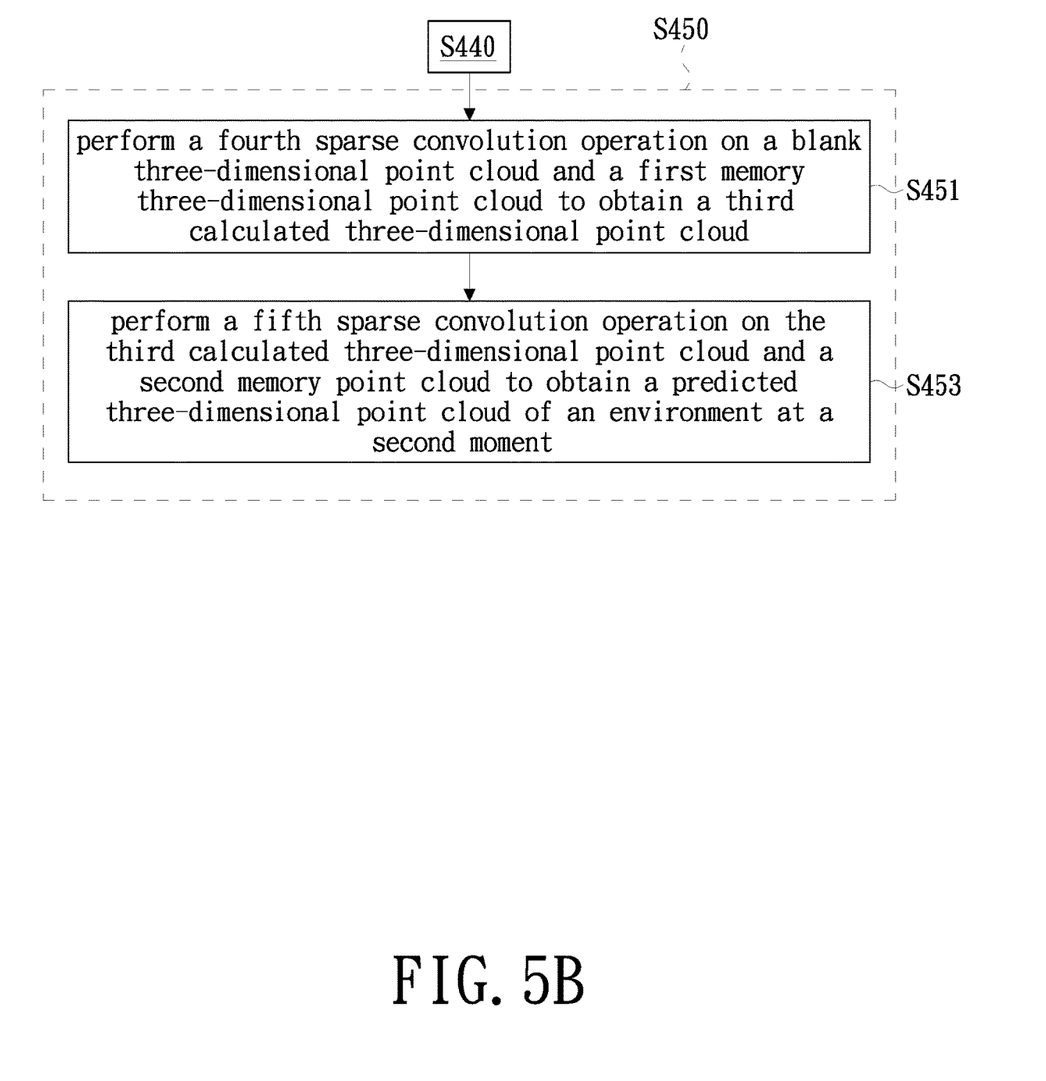
FIG. 5B is a flowchart of the environment prediction operation using a recurrent neural network model in the three-dimensional point cloud tracking method of FIG. 4.

In addition, in order to further explain the implementation details about step S450, the present invention further provides an implementation of step S450. Referring to FIG. 5B, which is a flowchart of the environment prediction operation using a recurrent neural network model in the three-dimensional point cloud tracking method of FIG. 4. In FIG. 5B, the same process steps as those in FIG. 4 are denoted by the same reference numbers, and no redundant detail is to be given herein.

In the embodiment of FIG. 5B, step S450 may further include steps S451 to S453. First, in step S451, the recurrent neural network model performs a fourth sparse convolution operation on a blank three-dimensional point cloud and a first memory three-dimensional point cloud stored in a memory to obtain a third calculated three-dimensional point cloud after a fourth sparse convolution. Thereafter, in step S453, the recurrent neural network model performs a fifth sparse convolution operation on the third calculated three-dimensional point cloud and a second memory point cloud stored in the memory to obtain a predicted three-dimensional point cloud of an environment at a second moment. Since the detailed procedure is as described in the aforementioned embodiment, no redundant detail is to be given herein.

In summary, the three-dimensional point cloud tracking apparatus and method using a recurrent neural network provided in the embodiments of the present invention not only can be used to reconstruct a three-dimensional point cloud of the entire environment, but also can be used to predict the three-dimensional point cloud of the entire environment at a later moment. Particularly, since the present invention targets the three-dimensional point cloud of the entire environment as a tracking object, therefore, in the reconstruction process, the present invention can utilize past point cloud information to supplement the current point cloud in a part of the area that cannot be detected due to a moving object being shielded so as to correctly reconstruct the three-dimensional point cloud of the environment at the current moment. Further, in the process of prediction, the present invention can be implemented by using the recurrent neural network model to model (i.e., encode) the entire environment so as to predict the three-dimensional point cloud of the environment at a later moment and accurately track the future changes of a moving object in the environment. In addition, the present invention can use the features of sparse convolution operation, and therefore in a reasonable time and computing capability, the present invention is able to effectively deal with complicated three-dimensional point cloud information to achieve the best effect of the above reconstruction and prediction.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional point cloud tracking apparatus using a recurrent neural network, comprising:
an input/output interface, configured to receive different observed three-dimensional point clouds at different moments in an environment, wherein the observed three-dimensional point clouds are obtained by a scanning of at least one LiDAR;
a memory, configured to store at least one memory three-dimensional point cloud related to the environment; and
a processor, electrically connected to the input/output interface and the memory respectively and configured to receive the observed three-dimensional point clouds and the at least one memory three-dimensional point cloud, wherein when receiving the observed three-dimensional point cloud of the environment at a first moment, the processor utilizes at least one recurrent neural network model to perform an environment reconstruction operation on the observed three-dimensional point cloud and the at least one memory three-dimensional point cloud to obtain a reconstructed three-dimensional point cloud of the environment at the first moment, and then utilizes the recurrent neural network model again to perform an environment prediction operation on the at least one memory three-dimensional point cloud and a blank three-dimensional point cloud to obtain a predicted three-dimensional point cloud of the environment at a second moment, wherein the second moment is later than the first moment;
wherein the at least one memory three-dimensional point cloud comprises a first memory three-dimensional point cloud and a second memory three-dimensional point cloud, and the step of utilizing the recurrent neural network model to perform the environment reconstruction operation on the observed three-dimensional point cloud and the at least one memory three-dimensional point cloud to obtain the reconstructed three-dimensional point cloud of the environment at the first moment comprises:
performing a first sparse convolution operation on the observed three-dimensional point cloud to obtain a first calculated three-dimensional point cloud;
performing a second sparse convolution operation on the first calculated three-dimensional point cloud and the first memory three-dimensional point cloud to obtain a second calculated three-dimensional point cloud and updating the first memory three-dimensional point cloud with the second calculated three-dimensional point cloud; and
performing a third sparse convolution operation on the second calculated three-dimensional point cloud and the second memory three-dimensional point cloud to obtain the reconstructed three-dimensional point cloud of the environment at the first moment and updating the second memory three-dimensional point cloud with the reconstructed three-dimensional point cloud.

2. The three-dimensional point cloud tracking apparatus according to claim 1, wherein the step of utilizing the recurrent neural network model again to perform the environment prediction operation on the at least one memory three-dimensional point cloud and the blank three-dimensional point cloud to obtain the predicted three-dimensional point cloud of the environment at the second moment comprises:
performing a fourth sparse convolution operation on the blank three-dimensional point cloud and the first memory three-dimensional point cloud to obtain a third calculated three-dimensional point cloud; and
performing a fifth sparse convolution operation on the third calculated three-dimensional point cloud and the second memory three-dimensional point cloud to obtain the predicted three-dimensional point cloud of the environment at the second moment.

3. The three-dimensional point cloud tracking apparatus according to claim 2, wherein the processor is further configured to define at least one weight self-defined function, at least one first sparse convolution kernel and at least one second sparse kernel, and the step of updating the first memory three-dimensional point cloud with the second calculated three-dimensional point cloud further comprises:
utilizing the weight self-defined function to determine a weight vector from the first memory three-dimensional point cloud, the second calculated three-dimensional point cloud, the first sparse convolution kernel and the second sparse convolution kernel, and updating the first memory three-dimensional point cloud to a result of substituting the first memory three-dimensional point cloud, the second calculated three-dimensional point cloud and the weight vector into a weight formula.

4. The three-dimensional point cloud tracking apparatus according to claim 3, wherein the step of updating the second memory three-dimensional point cloud with the reconstructed three-dimensional point cloud further comprises:
utilizing the weight self-defined function to determine the weight vector from the second memory three-dimensional point cloud, the reconstructed three-dimensional point cloud, the first sparse convolution kernel and the second sparse convolution kernel, and updating the second memory three-dimensional point cloud to a result of substituting the second memory three-dimensional point cloud, the reconstructed three-dimensional point cloud and the weight vector into the weight formula.

5. The three-dimensional point cloud tracking apparatus according to claim 4, wherein the weight self-defined function, the first sparse convolution kernel and the second sparse convolution kernel are defined by the three-dimensional point cloud tracking apparatus after completing a training mode, and a component of the weight vector is located between 0 and 1.

6. The three-dimensional point cloud tracking apparatus according to claim 5, wherein the weight formula is p×C1+(1−p)×C2, wherein p is the weight vector, and C1 and C2 respectively are the first memory three-dimensional point cloud and the second calculated three-dimensional point cloud, or the second memory three-dimensional point cloud and the reconstructed three-dimensional point cloud.

7. A three-dimensional point cloud tracking method using a recurrent neural network and executed in a three-dimensional point cloud tracking apparatus, the three-dimensional point cloud tracking apparatus comprising an input/output interface, a memory, and a processor, the three-dimensional point cloud tracking method comprising:
configuring the input/output interface to receive different observed three-dimensional point clouds at different moments in an environment, wherein the observed three-dimensional point clouds are obtained by a scanning of at least one LiDAR;
configuring the memory to store at least one memory three-dimensional point cloud related to the environment; and
configuring the processor to receive the observed three-dimensional point clouds and the at least one memory three-dimensional point cloud, configuring, when receiving the observed three-dimensional point cloud of the environment at a first moment, the processor to utilize at least one recurrent neural network model to perform an environment reconstruction operation on the observed three-dimensional point cloud and the at least one memory three-dimensional point cloud to obtain a reconstructed three-dimensional point cloud of the environment at the first moment, and configuring the processor to utilize the recurrent neural network model again to perform an environment prediction operation on the at least one memory three-dimensional point cloud and a blank three-dimensional point cloud to obtain a predicted three-dimensional point cloud of the environment at a second moment, wherein the second moment is later than the first moment;
wherein the at least one memory three-dimensional point cloud comprises a first memory three-dimensional point cloud and a second memory three-dimensional point cloud, and the step of utilizing the recurrent neural network model to perform the environment reconstruction operation on the observed three-dimensional point cloud and the at least one memory three-dimensional point cloud to obtain the reconstructed three-dimensional point cloud of the environment at the first moment comprises:
performing a first sparse convolution operation on the observed three-dimensional point cloud to obtain a first calculated three-dimensional point cloud;
performing a second sparse convolution operation on the first calculated three-dimensional point cloud and the first memory three-dimensional point cloud to obtain a second calculated three-dimensional point cloud and updating the first memory three-dimensional point cloud with the second calculated three-dimensional point cloud; and
performing a third sparse convolution operation on the second calculated three-dimensional point cloud and the second memory three-dimensional point cloud to obtain the reconstructed three-dimensional point cloud of the environment at the first moment and updating the second memory three-dimensional point cloud with the reconstructed three-dimensional point cloud.

8. The three-dimensional point cloud tracking method according to claim 7, wherein the step of utilizing the recurrent neural network model to perform the environment prediction operation on the at least one memory three-dimensional point cloud and the blank three-dimensional point cloud to obtain the predicted three-dimensional point cloud of the environment at the second moment comprises:
performing a fourth sparse convolution operation on the blank three-dimensional point cloud and the first memory three-dimensional point cloud to obtain a third calculated three-dimensional point cloud; and performing a fifth sparse convolution operation on the third calculated three-dimensional point cloud and the second memory three-dimensional point cloud to obtain the predicted three-dimensional point cloud of the environment at the second moment.

9. The three-dimensional point cloud tracking method according to claim 8, wherein the processor is further configured to define at least one weight self-defined function, at least one first sparse convolution kernel and at least one second sparse kernel, and the step of updating the first memory three-dimensional point cloud with the second calculated three-dimensional point cloud further comprises:

utilizing the weight self-defined function to determine a weight vector from the first memory three-dimensional point cloud, the second calculated three-dimensional point cloud, the first sparse convolution kernel and the second sparse convolution kernel, and updating the first memory three-dimensional point cloud to a result of substituting the first memory three-dimensional point cloud, the second calculated three-dimensional point cloud and the weight vector into a weight formula.

10. The three-dimensional point cloud tracking method according to claim 9, wherein the step of updating the second memory three-dimensional point cloud with the reconstructed three-dimensional point cloud further comprises:

utilizing the weight self-defined function to determine the weight vector from the second memory three-dimensional point cloud, the reconstructed three-dimensional point cloud, the first sparse convolution kernel and the second sparse convolution kernel, and updating the second memory three-dimensional point cloud to a result of substituting the second memory three-dimensional point cloud, the reconstructed three-dimensional point cloud and the weight vector into the weight formula.

11. The three-dimensional point cloud tracking method according to claim 10, wherein the weight self-defined function, the first sparse convolution kernel and the second sparse convolution kernel are defined by the three-dimensional point cloud tracking apparatus after completing a training mode, and a component of the weight vector is located between 0 and 1.

12. The three-dimensional point cloud tracking method according to claim 11, wherein the weight formula is $p \times C1 + (1-p) \times C2$, wherein p is the weight vector, and C1 and C2 respectively are the first memory three-dimensional point cloud and the second calculated three-dimensional point cloud, or the second memory three-dimensional point cloud and the reconstructed three-dimensional point cloud.

* * * * *